United States Patent [19]

Carter et al.

[11] Patent Number: 5,225,883
[45] Date of Patent: Jul. 6, 1993

[54] VIDEO TEMPERATURE MONITOR

[75] Inventors: Hudson R. Carter, Granville; John W. Berthold, Salem, both of Ohio; Charles C. England, Lynchburg, Va.

[73] Assignee: The Babcock & Wilcox Company, New Orleans, La.

[21] Appl. No.: 711,469

[22] Filed: Jun. 5, 1991

[51] Int. Cl.$^5$ ............................................. C01J 5/18
[52] U.S. Cl. ........................................ 356/45; 374/124
[58] Field of Search ............... 250/226; 356/45, 41, 356/73; 359/638; 374/124, 137

[56] References Cited

U.S. PATENT DOCUMENTS

| | | |
|---|---|---|
| 4,411,519 | 10/1983 | Tagami ................................. 356/45 |
| 4,413,324 | 11/1983 | Tatsuwaki et al. .................... 356/45 |
| 4,527,896 | 7/1985 | Irani et al. ............................ 356/43 |
| 4,883,353 | 11/1989 | Hausman et al. ..................... 356/41 |
| 5,040,872 | 8/1991 | Steinle ................................. 359/638 |

OTHER PUBLICATIONS

B&W Prospectus No. 89-249 "Development of a Flame Quality Analyzer Camera System" Oct. 13, 1989.
Mikron Brochure "Mikron M77/78 Series" pp. 1-8, date of publication (if any) unknown.
Mikron Brochure "Fiber Optic Infrared Temperature Measurement and Control Systems" date of publication, if any, unknown, pp. 1-8.
Mikron Brochure "Mikron M668 A Smart Infrared Fiber Optic Temperature Transmitter" pp. 1-6 date of publication, if any, unknown.

Primary Examiner—Vincent P. McGraw
Assistant Examiner—K. P. Hantis
Attorney, Agent, or Firm—Vytas R. Matas; Robert J. Edwards; Daniel S. Kalka

[57] ABSTRACT

An apparatus and method for providing a real-time video display and a temperature map display of an object, in particular a flame, comprises a single CCD video camera and optical equipment which focuses separate light bundles onto a photosensitive surface of the camera. A separate band pass filter is used in each light bundle to filter selected different wavelengths of light. The video signal from the camera is used in a video digitizer to obtain data which can be used to calculate a temperature map based on the different wavelengths of light of the two bundles. The video signal is also used to produce a real-time video display of the object.

7 Claims, 1 Drawing Sheet

VIDEO TEMPERATURE MONITOR

FIELD AND BACKGROUND OF THE INVENTION

The present invention relates in general to flame-monitoring equipment, and in particular to a new and useful video camera based measuring instrument which provides real-time displays of an object along with a two dimensional temperature map of the object which is determined using two-color pyrometry.

Optical pyrometry is a measurement technique in which the temperature of an object is determined based on the magnitude of the thermal radiation emitted by the object. In general, the radiant energy emitted by an object is measured at one or two wavelengths. These measured spectral energies are related to the temperature of the object using Planck's radiation function:

$$W(\lambda,T) = \epsilon \cdot C_1/(\lambda^5 \cdot [\exp\{C_2/\lambda T\}] - 1)$$

where:
$W(\lambda,T)$—spectral radiant emittance of object
$\epsilon$—emissivity of object
$\lambda$—wavelength of radiation
$T$—temperature of object
$C_1, C_2$—constants Most optical pyrometers are single point devices which provide a temperature that represents a spatial average. Spatial distribution of temperature can be determined only through a series of single point measurements as disclosed in U.S. Pat. No. 4,644,173 assigned to The Babcock & Wilcox Company. In this reference, improvements in spatial resolution were achieved by using optical fibers and photodiode arrays to provide multiple and near simultaneous measurements of temperature. This technique provides improved spatial resolution in temperature measurement, but is limited by the number of simultaneous measurements.

Devices which provide spatially-resolved, two-dimensional temperature maps have been developed. These are of two types: scanning devices which use a single detector in concert with scanning optics that permit measurement of the spatial distribution of spectral energy, and a video camera type which can provide a two-dimensional spectral image.

The sophistication of these devices varies greatly. In some instances, the two-dimensional image of spectral energy is used only to infer regions of hot and cold. With other devices, the temperature at some point in the spectral image must be known (a benchmark) before the two-dimensional temperature map can be determined. Scanning devices have demonstrated the capability to generate two-dimensional temperature maps without the need for this type of benchmarking. All of these devices are analogous to single color pyrometers in that the spatial distribution of intensity is measured at only one wavelength.

SUMMARY OF THE INVENTION

An object of the present invention is to provide a video temperature monitor comprising a measurement instrument that yields a real-time display of an object along with a two dimensional temperature map of the object determined using two-color pyrometry.

The components that comprise the invention include an objective lens that collects light from the surroundings for the purpose of forming a focused image, a beam splitter, optical bandpass filters, a path length equalizer, focussing lens, a black and white CCD (charge coupled device) camera, a video digitizer and storage device (frame grabber), a processor, and video displays.

A further object of the present invention is to provide a method of real-time display for an object and a temperature map of the object which is practiced using the apparatus of the invention, and further to provide a measurement apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
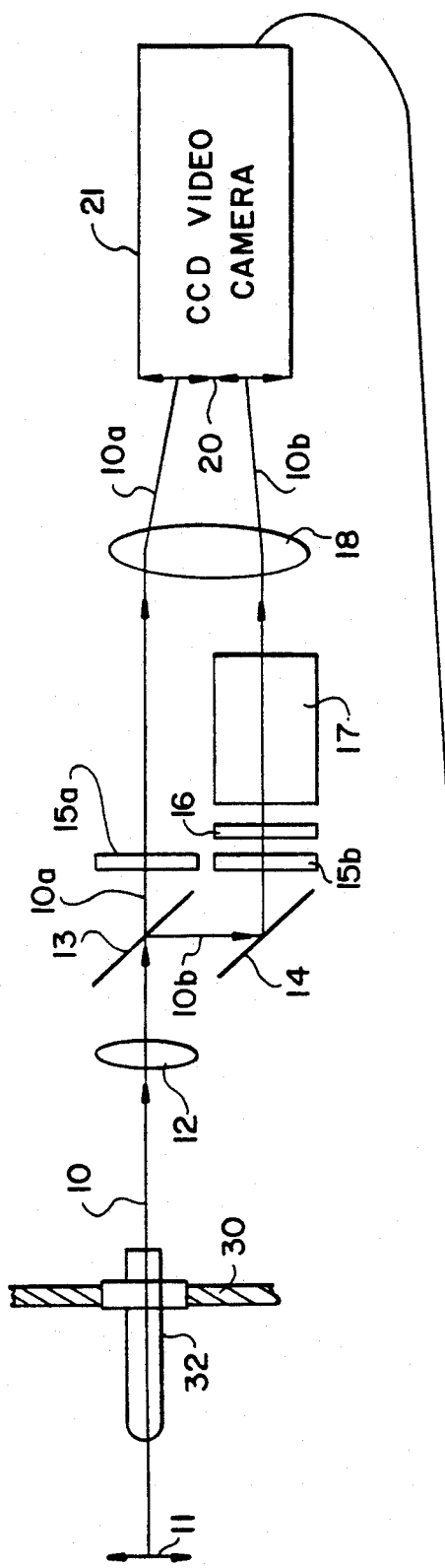
FIG. 1 is a schematic representation of the measurement apparatus of the present invention.
Figure 1:
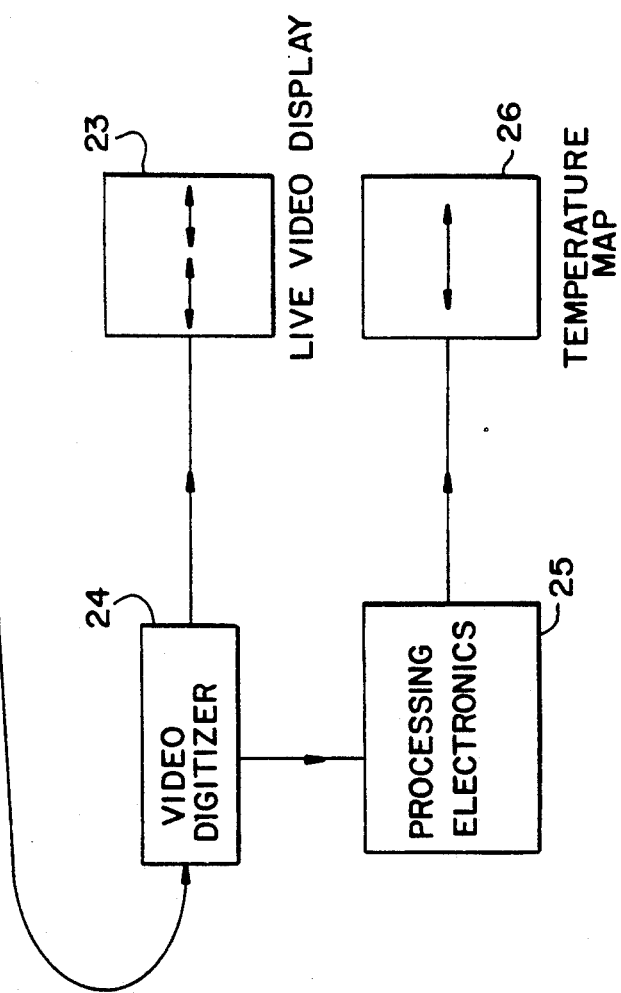

Referring to the drawing in particular, the invention embodied therein comprises a measurement instrument or apparatus for providing a real-time display of an object 11, for example, a flame or heated area in a furnace or boiler, utilizing an objective lens 12 and a beam splitter 13, along with other optical elements, to form the appropriate displays.

The objective lens 12 provides the function of collecting and focussing light from the object 11 to form an image. The object 11 may be a flame in a furnace with a wall 30 and the image light may pass through a purged sight tube or probe 32. The beam splitter 13 divides the bundle of light rays 10 that pass through the objective lens 12 into two bundles of light rays 10a and 10b. Each light ray bundle will form a real image of the same size. The beam splitter 13 can be of the wavelength division type in which the two ray bundles 10a and 10b are comprised of light of different regions of the wavelength spectrum, or of the intensity division type in which both ray bundles contain the full wavelength spectrum of light but are of only about ½ the intensity as the original unsplit ray bundle 10. After the single ray bundle is split into two, the optical axis of the ray bundle 10(b) is directed with a mirror 14 so that the optical axes of the two ray bundles 10(a) and 10(b) are nearly parallel.

One optical bandpass filter 15a and 15b is located in the path of each ray bundle 10a and 10b. Each filter passes light of a specified and different narrow wavelength range and reflects or absorbs all other wavelengths. Filter 15a may pass the sodium 589 nm wavelength, for example, and filter 15b may pass the potassium 768 nm wavelength.

In general, the intensities of the bandpass filtered light in each bundle will not be the same. Depending on the throughput transmission at each wavelength and the temperature of the object, the intensity of the light at the two wavelengths may be substantially different. A neutral density filter 16 placed in the path of highest intensity can have the effect of extending the overall dynamic range of the instrument.

Each of the ray bundles will form a focussed image about their own optical axis. It is a necessary requirement that the two ray bundles form focussed images at the photosensitive surface 20 of a CCD camera 21. However, as a result of splitting and re-directing the optical path of the ray bundle 10(b), the two ray bundles 10(a) and 10(b) will not both form focused images at the photo sensitive surface of the CCD camera sensor. To accomplish this, glass or other material 17 is placed in the path of the ray bundle 10(b) for the purpose of equalizing the optical paths so that two side-by-side focused images are formed at the same surface or plane of the CCD array. This structure is referred to here, as path length compensation means 17.

A lens 18 just upstream of the CCD camera 21 can be used to adjust the size and location of the images on the CCD camera. Since the size of the photosensitive sensor array is fixed, changing the size of the image has the effect of changing the overall field of view of the instrument.

With the optical arrangement described above, the CCD camera 21 will provide two side-by-side images as viewed on a video monitor 23. The gray scale intensity variation in each image represents the spatial variation in spectral energy at the two bandpassed wavelengths. In order to provide better spatial resolution in each of the images, a mask or field stop may be employed in the optical system, for example, as part of lens 18. The purpose of this mask is to prevent overlay of a portion of one of the images on a portion of the second image and to provide a well-defined boundary between the two images.

CCD array cameras are comprised of many individual photosensitive sites called pixels. CCD cameras typically have tens of thousands or hundreds of thousands of individual pixels, with each pixel representing a small area in the object plane. In the invention, each pixel in one of the images has a corresponding pixel in the second image that defines the identical region of space.

The video signal generated by the camera is input to a video digitizer 24 (frame grabber) which serves the purpose of converting the analog video signal (proportional to light energy) from each pixel to a digital value that is stored in computer memory in the digitizer 24 or in processing electronics 25 connected to the digitizer. The digitized picture consists of an array of numerical values proportional to light energy on each pixel in the CCD array.

At each point in the object as defined by a pixel location in each image, the color temperature represented by the energies measured at the two wavelengths can be calculated via two-color pyrometry relationships based on the Planck equation. This can be done in processing electronics 25.

As shown in the figure, the video signal from the CCD camera 21 is displayed on the video screen 23, providing a real-time or "live" display of the object. The digital data that resides in the computer is processed using two-color pyrometry to determine the temperature associated with each pixel location in the image. The resulting two-dimensional, spatially-resolved temperature map can be displayed in many different ways. For example, as a false color temperature map on a second video display 26 in which a defined color scale represents a temperature scale, as a contour plot of isotherms, or as a three-dimensional plot in which two axes represent the two spatial dimensions of the object and the third dimension is temperature.

There are several advantages of the present invention over the prior art.

There are no moving parts in the invention. It is thus not subject to the mechanical breakdown and misalignment of optical scanning devices.

The invention uses solid state detectors for measuring spectral intensities rather than video tubes. A solid state device offers several advantages over tube type video detectors. Solid state devices have a quicker recovery from a saturation condition, less video lag, no burnt-in ghost images resulting from a sustained high intensity image, and less sensitivity to ambient temperature changes.

Other two-dimensional temperature mapping systems use single-color pyrometry, while the present invention uses two-color pyrometry. Two-color pyrometry offers an advantage because spatial variation in the emittance of the object or an intermediate medium that attenuates the signal is not interpreted as variation in temperature as with single-color pyrometry.

The beam-splitting technique of producing side-by-side spectral images on the same photo-detection device is an advantage over images produced on two separate photo-detection devices. The use of a single electro-optic device eliminates sources of differential drift in the offset and gain of the electronics and electro-optics.

With the use of CCD type cameras, variations in the magnitude of the intensity signal can be accommodated without the use of neutral density filters or a variable aperture stop (e.g., an iris). CCD cameras have electronic shuttering capability that can accommodate large changes in signal strength without saturating the photo-diodes in the array. Electronic shuttering also eliminates the spatially variable attenuation common to aperture stops.

Temperature errors caused by time aliasing of the signals from the two spectral images are essentially eliminated. With most single-detector, two-color measurements, the intensity signals at the two wavelengths are measured at different times. Then, changes in the source intensity at frequencies that approach the sampling frequency of the measurement result in errors in the calculated temperature. With the present invention, sampling occurs at video rates, so that the time difference between measurements of the two intensities at a single spatial point is typically less than 70 microseconds.

As described, the CCD arrays in camera 21 are of the silicon photo-diode type. These arrays are inexpensive, readily available, and are sensitive to light with wavelengths up to about 1 micron. CCD arrays fabricated of other materials that are sensitive in different spectral ranges may be advantageous in some applications.

The beam splitting and focussing of the two images may be attained using many different optical components and configurations. These include wavelength division, intensity division, mirrors, and prisms. Also, the order of the optical components need not be the same as indicated in the drawing. For example, the beam splitting and wavelength filtering optics can be located upstream of the objective lens.

The exact location of the bandpass filters is also unimportant, provided the side-by-side images are filtered at the two different wavelengths.

As described, the invention uses one or two lenses to form side-by-side images on the CCD array. The invention may employ multiple lenses (more than three) for the purpose of enhancing the image quality or the field of view of the instrument.

While a specific embodiment of the invention has been shown and described in detail to illustrate the application of the principles of the invention, it will be understood that the invention may be embodied otherwise without departing from such principles.

What is claimed is:

1. An apparatus for providing a real-time display and temperature map of an object, comprising:

a single CCD video camera having a photosensitive surface;

dividing means for dividing a bundle of light from the object into two light bundles;

filter means for only passing a different selected wavelength of light from each divided light bundle with all other wavelengths being absorbed or reflected;

optical means for focussing the two selected wavelengths of light passed from the divided light bundles onto the photosensitive surface of the single CCD video camera, the video camera producing a video signal therefrom;

pathlength compensation means in one of the divided light bundles for adjusting an optical pathlength of the one divided light bundle to be substantially equal to an optical pathlength of the other divided light bundle;

a video digitizer connected to said camera for digitizing the video signal into a digitized signal;

a first video display connected to the video digitizer for producing a real-time display of the two selected wavelengths of light passed from the divided light bundles;

processing means connected to said digitizer for processing the digitized signal to form temperature map data calculated from relative intensities of the two selected wavelengths of light passed from the divided light bundles; and a second video display connected to said processing means for providing a temperature map display corresponding to the temperature map data.

2. An apparatus according to claim 1, wherein said filter means includes a separate bandpass filter in the path of each of said divided light bundles.

3. An apparatus according to claim 1, including a neutral density filter in the path of one of the divided light bundles having highest intensity for equalizing the intensity of both divided light bundles before they reach the video camera.

4. An apparatus according to claim 1, wherein the optical means focuses the two divided light bundles onto separate locations on the photosensitive surface.

5. A method of forming a real-time display and temperature map of an object, comprising:

splitting a light bundle from the object into two divided light bundles;

passing a different selected wavelength of light from each divided light bundle with all other wavelengths being absorbed or reflected;

focussing the two selected and different wavelengths of light passed from the divided light bundles onto a photosensitive surface of a single CCD video camera to produce a video signal;

adjusting an optical pathlength of the one divided light bundle to be substantially equal to an optical pathlength of the other divided light bundle with pathlength compensation means;

digitizing the video signal;

using the video signal to form a first video display of a real-time display of the two selected and different wavelengths of light passed from the divided light bundles;

calculating from the digitized video signal a temperature map of the object; and displaying the temperature map on a second video display corresponding to the temperature map data.

6. A method according to claim 5, including dividing the bundle of light coming from the object using a beam splitter to form two divided light bundles and using a mirror to divert one of the divided light bundles so that it extends in a path which is substantially parallel to the path of the other divided light bundle.

7. A method according to claim 6, including focussing the parallel divided light bundles onto separate locations of the photosensitive surface.

* * * * *